US012757835B2

(12) United States Patent
Hamilton et al.

(10) Patent No.: US 12,757,835 B2
(45) **Date of Patent: *Oct. 13, 2026**

(54) ADJUSTABLE SENSOR ON SWATHBOARD OF MOWER

(71) Applicant: AGCO Corporation, Duluth, GA (US)

(72) Inventors: Kevin J. Hamilton, Newton, KS (US); James Kraus, Hesston, KS (US); Patrick Kendrick, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 341 days.

This patent is subject to a terminal disclaimer.

(21) Appl. No.: 18/539,420

(22) Filed: Dec. 14, 2023

(65) Prior Publication Data

US 2024/0215479 A1 Jul. 4, 2024

Related U.S. Application Data

(60) Provisional application No. 63/435,854, filed on Dec. 29, 2022.

(51) Int. Cl.
*A01D 57/24* (2006.01)
*A01D 34/66* (2006.01)
(Continued)

(52) U.S. Cl.
CPC ........... *A01D 57/24* (2013.01); *A01D 34/664* (2013.01); *A01D 34/668* (2013.01); *A01D 43/085* (2013.01); *A01D 57/26* (2013.01)

(58) Field of Classification Search
CPC ...... A01D 57/24; A01D 57/26; A01D 34/664; A01D 34/665; A01D 34/668; A01D 43/085
See application file for complete search history.

(56) References Cited

U.S. PATENT DOCUMENTS 5,463,852 A 11/1995 Michael
6,158,201 A 12/2000 Pruitt et al.
(Continued)

FOREIGN PATENT DOCUMENTS

EP 4159023 A1 4/2023
EP 4159024 A1 4/2023
(Continued)

OTHER PUBLICATIONS

UK Intellectual Property Office, Search Report for GB Application No. GB2301261.0, dated Jul. 27, 2023, 4 pages.

*Primary Examiner* — Christopher J Sebesta
*Assistant Examiner* — Julia C Tran

(57) ABSTRACT

A mower configured to cut plant material as it moves over a field and deposit the cut plant material onto the field, the mower having a header assembly having a cutter bed, conditioning rollers, and a swathboard, the swathboard being positionable to shape the cut plant material into windrows. The cutter bed has a plurality of rotating rotary cutters that includes at least one pair of oppositely rotating cutters that sends a rearwardly-directed stream of cut plant material between the oppositely rotating pair of rotary cutters. The header assembly includes a sensor system mounted on the swathboard. The sensor system has a sensor configured to collect nutrient information of the plant material being cut by the mower. The sensor is positioned on the swathboard to coincide with the location where the stream of cut plant material interacts with the swathboard.

6 Claims, 8 Drawing Sheets

(51) Int. Cl.
*A01D 43/08* (2006.01)
*A01D 57/26* (2006.01)

(56) References Cited

U.S. PATENT DOCUMENTS

| | | | | |
|---|---|---|---|---|
| 7,859,674 | B2 * | 12/2010 | Greten | G01N 21/276 702/41 |
| 2006/0027750 | A1 * | 2/2006 | Kormann | A01F 15/08 250/341.8 |
| 2014/0111792 | A1 * | 4/2014 | Claussen | G01N 21/55 356/72 |
| 2018/0242523 | A1 * | 8/2018 | Kirchbeck | A01C 21/005 |
| 2021/0015032 | A1 * | 1/2021 | Murray | A01D 34/008 |
| 2021/0195833 | A1 | 7/2021 | Hamilton | |
| 2022/0210972 | A1 * | 7/2022 | Fay, II | A01D 41/1275 |
| 2022/0210974 | A1 | 7/2022 | Fay, II et al. | |
| 2022/0210975 | A1 * | 7/2022 | Digman | A01F 15/00 |
| 2023/0049727 | A1 | 2/2023 | Hamilton et al. | |
| 2023/0055283 | A1 | 2/2023 | Hamilton et al. | |

FOREIGN PATENT DOCUMENTS

| | | | |
|---|---|---|---|
| RU | 1806540 | C | 4/1993 |
| WO | 1999018769 | A1 | 4/1999 |
| WO | 2001046678 | A2 | 6/2001 |
| WO | 2022229736 | A1 | 11/2022 |
| WO | 2022229737 | A1 | 11/2022 |

* cited by examiner

ADJUSTABLE SENSOR ON SWATHBOARD OF MOWER

CROSS REFERENCE TO RELATED APPLICATION

This application claims the benefit of U.S. Provisional Application No. 63/435,854, filed Dec. 29, 2022, which is hereby incorporated by reference in its entirety.

BACKGROUND OF THE INVENTION

Field

The present invention relates to systems and methods for cutting plant material, and more particularly, sensors for testing the quality of the plant material as it is harvested.

Description of Related Art

A mower (or windrower or swather) is an agricultural machine configured to cut plant material growing in a field and deposit the cut plant material in windrows (or swaths) on the field to dry. An example mower is the Massey Ferguson WR9980 self-propelled mower. Once the cut plant material is properly dry, a baler is passed through the field to form the harvested material into bales. The cut plant material is then baled for easier transport, storage, and use. An example baler is the Massey Ferguson LB2200 large square baler.

The quality of the hay has a large factor on the price that hay producers can charge for the product. Some hay quality parameters are "relative feed value" (RFV), a protein content value, a fiber content value, a "total digestible nutrient" (TDN) value, an "acid detergent fiber" (ADF) value, and a "neutral detergent fiber" (NDF) value. These factors influence the amount of revenue per acre a forage producer may receive. Often, buyers of premium forage, such as the dairy or export industries, require a minimum RFV score, and if the forage does not meet the premium market it is sold into other uses at a significantly reduced price.

It is known to test samples of the plant material in order to determine hay quality properties that are relevant to its sale or use value. Typically, such testing is done on the plant material after it has been baled. Once a number of bales have been created, a core sample is taken from one of the bales and sent to a third-party laboratory for, e.g., near-infrared (NIR) testing to determine these properties. Testing may also be performed during the baling process such as described in commonly assigned U.S. patent Ser. No. 17/758,055, entitled SYSTEM AND METHOD FOR MORE ACCURATELY DETERMINING OVERALL QUALITY OF BALED PLANT MATERIAL. In an NIR testing system, light having wavelengths between 780 nm and 2500 nm is emitted by the instrument and then reflected by the plant material before being received back into the instrument; filtered and converted to a voltage or current; and then analyzed to determine the properties of the plant material.

While it is necessary to allow the cut crop to dry before baling, there is a reduction in quality parameters during this drying process. It would be desirable to be able to determine quality parameters at the time the plant material is cut by the mower so that drying and baling practices may be optimized to maintain favorable hay quality.

This background discussion is intended to provide information related to the present invention which is not necessarily prior art.

BRIEF SUMMARY

In one aspect the invention is directed to a mower configured to cut plant material as it moves over a field and deposit the cut plant material onto the field, the mower having a header assembly having a cutter bed, conditioning rollers, and a swathboard, the swathboard being positionable to shape the cut plant material into windrows. The cutter bed has a plurality of rotating rotary cutters, where said plurality of rotary cutters includes at least one pair of oppositely rotating rotary cutters that sends a rearwardly-directed stream of cut plant material between the oppositely rotating pair of rotary cutters. The header assembly includes a sensor system mounted on the swathboard. The sensor system has a sensor configured to collect nutrient information of the plant material being cut by the mower. The sensor is positioned on the swathboard to coincide with the location where the stream of cut plant material interacts with the swathboard.

This summary is not intended to identify essential features of the present invention, and is not intended to be used to limit the scope of the claims. These and other aspects of the present invention are described below in greater detail.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized, and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present invention can include a variety of combinations and/or integrations of the embodiments described herein.

Figure 1:
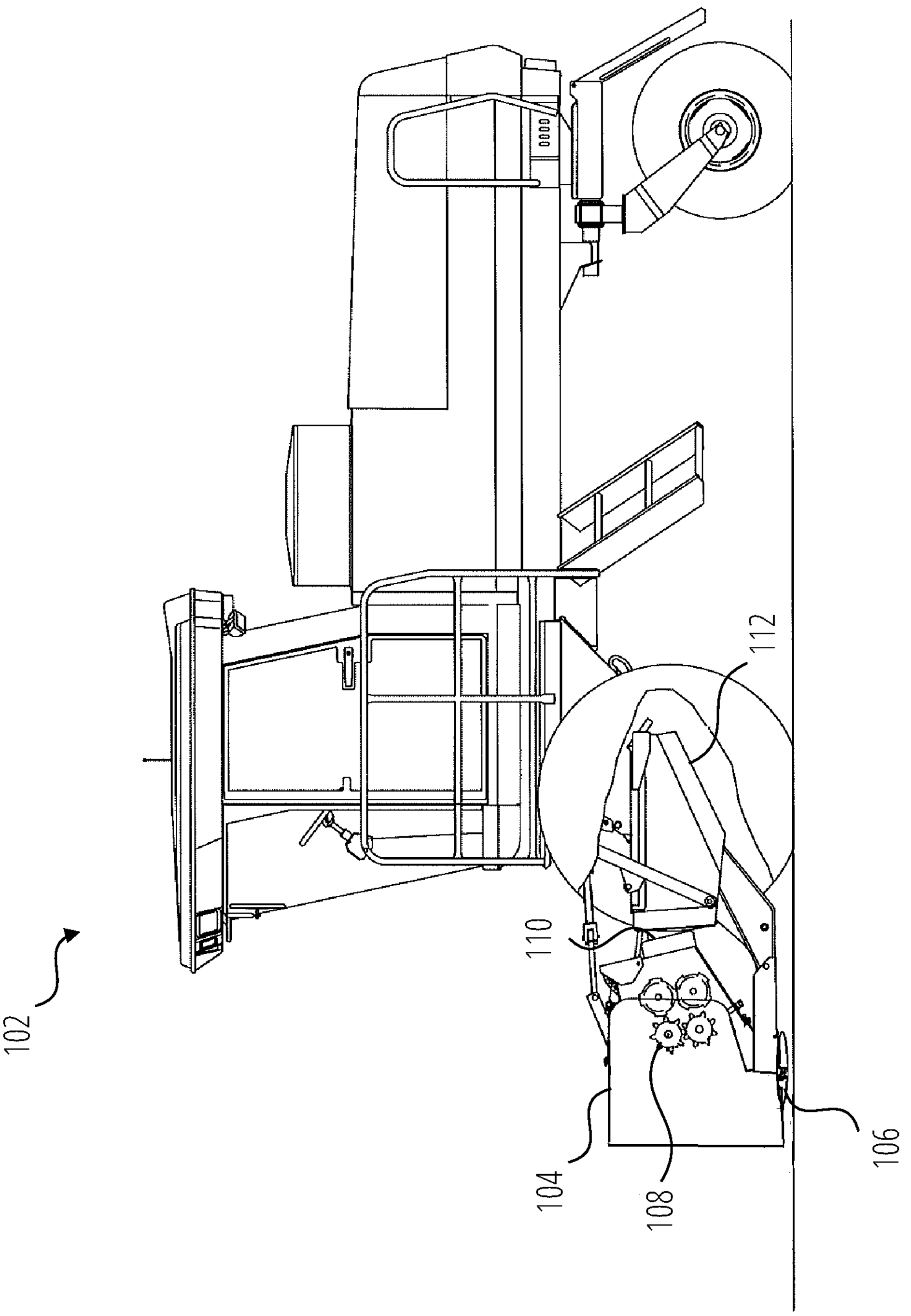
FIG. 1 illustrates a mower having a header assembly in accordance with one embodiment.

Referring to FIG. 1, an example mower 102 is shown into which embodiments of the present invention may be incorporated. Although the example mower 102 is a self-propelled mower, it will be appreciated that embodiments of the present invention may be incorporated into other types of mowers (e.g., towed) with few or no changes. Broadly, the mower 102 may be configured to move over a field, cut plant material, and deposit the cut plant material in windrows on the field. The mower 102 may generally include a header assembly 104, the header assembly 104 having a cutter bed 106, conditioning rollers 108, a swathboard 110, and forming shields 112. The cutter bed 106 may be configured to cut the plant material, and may include one or more cutting elements appropriate to the nature of the plant material being cut. The illustrated embodiment of the cutter bed 106 is a rotary-type design, however, other suitable designs may also be used. The conditioning rollers 108 may be configured to condition (e.g., crush, macerate) the cut plant material, which facilitates drying.

The swathboard 110 is positionable to assist in directing the conditioned plant material back to the ground and shape the windrows (especially to have a generally wider width when the swathboard 110 is lowered for maximum contact with the flow of plant material). The forming shields 112 are positionable to further assist in directing the conditioned plant material back to the ground and shape the windrows (especially to have a generally narrower width when the swathboard 110 is raised to allow the flow of plant material to reach the forming shields 112). Thus, the cutter bed 106 cuts the plant material at a particular cut height, the conditioning rollers 108 condition the cut plant material, and the swathboard 110 and forming shields 112 direct the conditioned plant material back to the ground and shape the windrows. The cutter bed 106, the conditioning rollers 108, the swathboard 110 and the forming shields 112, except as discussed herein, may be of conventional design and are known to those skilled in the art, so need not be described in further detail.

Figure 2:
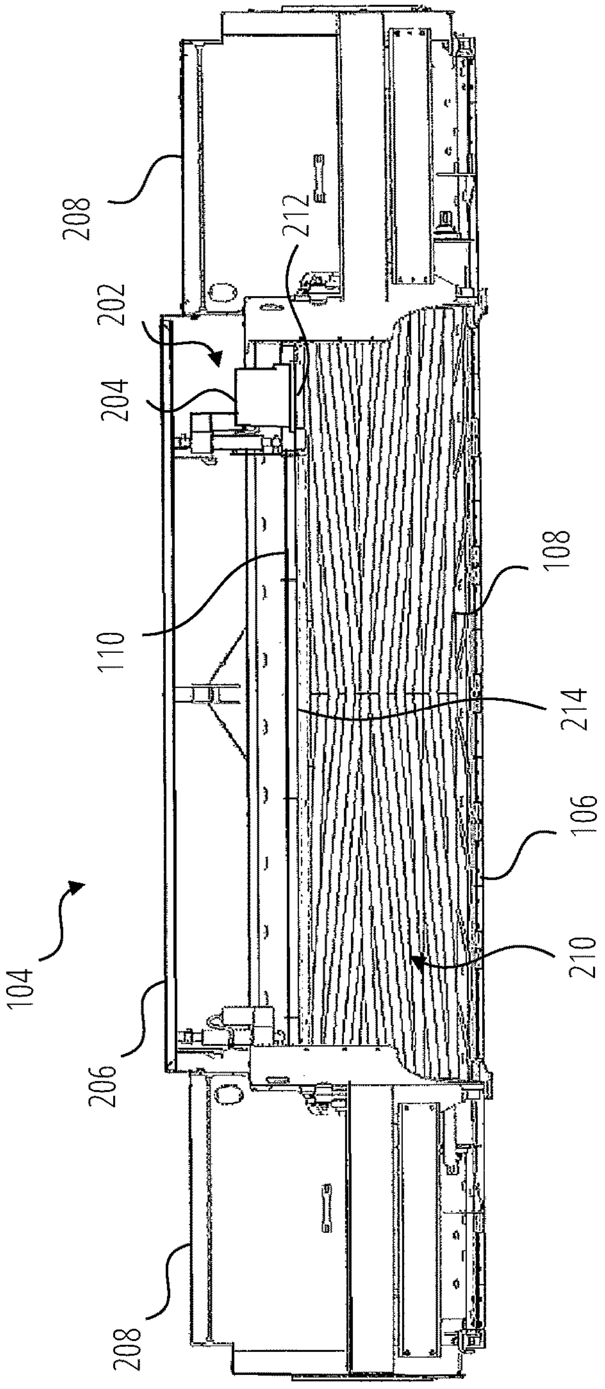
FIG. 2 illustrates a rear elevation vies of the header assembly of FIG. 1 in accordance with one embodiment.
Figure 3:
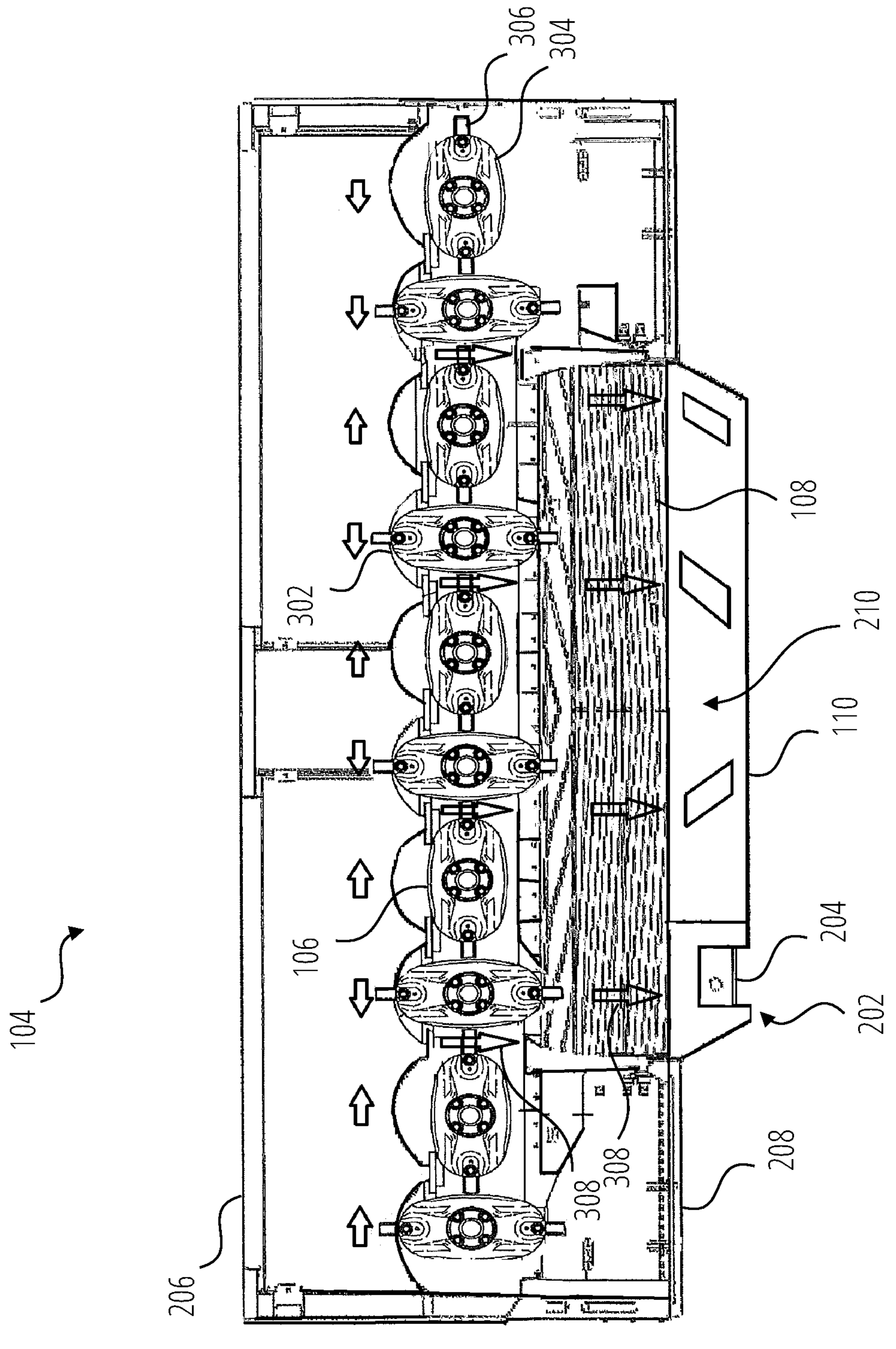
FIG. 3 illustrates a bottom view of the header assembly of FIG. 1 in accordance with one embodiment.

Referring also to FIGS. 2 and 3, the header assembly 104 contains a sensor system 202 mounted on the swathboard 110. The sensor system 202 contains a sensor 204 that can be used to collect nutrient information of the plant material during the mowing process as the mower 102 moves through the field. The sensor 204 may be a near-infrared (NIR) sensor configured to emit near-infrared radiation or a non-contact spectral solution sensor using hyper or multi spectral vision systems, and may receive a reflected response from the plant material, analyze the reflected response to determine the properties of the plant material and generate evaluation information reflecting one or more properties of the plant material, including an actual value for an RFV, a protein content value, a fiber content value, a TDN value, an ADF value, and an NDF value, or other property of interest. The sensor system 202 may use any sensor 204 known by one skilled in the art. Combined with position information of the mower 102 provided by a positioning system typically installed on mowers, plant material information collected from the sensor 204 can be used to measure quality parameters of the cut plant material as the plant material passes through the header assembly 104, and the plant material information also may be used to map the plant quality parameters and map fertilizer prescriptions that can then be used at a later time to replace the harvested nutrients.

The sensor 204 is positioned on the swathboard 110 to coincide with the location where the crop stream interacts with the swathboard. The quality and usefulness of the signal generated by the sensor 204 depends on the orientation of a crop-facing sensor face 212 of the sensor 204 relative to the crop stream passing through the header assembly 104, and the ideal orientation of the sensor 204 relative the crop stream may change during operation mower 102 depending on things like mass flow of the cut crop and position of the swathboard 110 and a crop-facing surface 214 of the swathboard 110.

The header assembly 104 may have a generally open, box-like framework 206. The framework 206 has pair of laterally extending end portions 208 that project outwardly beyond the conditioning rollers 108, with inner ends of the end portions 208 defining therebetween the boundary of a discharge opening 210 through which cut crop passes as it moves rearwardly in the header assembly 104.

The cutter bed 106 extends laterally in the form of a low profile, rotary style cutter bar located adjacent the front of the framework 206 for severing crop from the ground as the mower 102 moves across a field. As best seen in FIG. 3, the illustrated cutter bed 106 includes a series of ten rotary cutters 302 spaced across the path of travel of the mower 102 and each being rotatable about its own upright axis. A larger or smaller number of rotary cutters 302 could be provided. The rotary cutters 302 are rotatably supported on an elongated, flat gear case (not shown) extending the full length of the cutter bed 106 that may contain a train of flat spur gears (not shown) that are operably engaged with one another and thus serve to distribute driving power between one another, although other forms of power distribution means may be used within the case (e.g., shafts and bevel gears, belts and pulleys, or chains and sprockets).

It will be appreciated that the rotary cutters 302 are similar in construction. Each of the rotary cutters 302 may include a generally elliptical, metal knife carrier 304, and a pair of free-swinging knives 306 at opposite ends of the knife carrier 304, as well understood by those of ordinary skill in the art. As perhaps best shown in FIG. 3, each of the rotary cutters 302 may be ninety degrees out of phase with respect to the adjacent cutters, inasmuch as the circular paths of travel of the knives 306 of adjacent cutters overlap one another and may be appropriately out of phase in order to avoid striking each other. Due to the positive mechanical drive connection between the rotary cutters 302, the cutters remain properly in phase with one another. The knives 306 of the rotary cutters 302 cooperatively present a substantially planar cutting zone, within which crop is severed from the ground.

In the illustrated embodiment, the header assembly 104 has a centrally disposed discharge opening 210 behind the cutter bed 106 that is shorter than a length of the cutter bed 106 and which serves as an inlet to the conditioning rollers 108 such that the internal six rotary cutters 302 may be described as a group of "inboard" cutters. On the other hand, the axes of rotation of the two outermost rotary cutters 302 on each side are all disposed outboard of the lateral limits of discharge opening 210 and outboard of conditioning rollers 108 such that those cutters may be described as "outboard" cutters. While the illustrated embodiment has two sets of outboard cutters, other embodiments may utilize only a single set of outboard cutters, or more than two sets.

Thus, it will be noted that the cutter bed 106 projects laterally outwardly beyond both ends of the discharge opening 210 to present left and right outboard cutter sections. The spur gears in the case are intermeshed in such a manner that the rotary cutters 302 of each outboard section rotate in the same direction, as indicated by the arrows in FIG. 3. It will also be appreciated that the spur gears may be arranged in such a manner that the rotary cutters 302 (excluding the outermost cutter on either side) are divided into cooperating pairs, with the two cutters of each pair rotating in opposite directions as shown by the arrows in FIG. 3. In other words, the second and third rotary cutters 302 from the left rotate toward one another across the front of the cutter bed 106, as do the fourth and fifth rotary cutters 302 from the left, the sixth and seventh rotary cutters 302, and the eighth and ninth rotary cutters 302. The illustrated cutter bed 106 is of the same general arrangement as that disclosed in U.S. Pat. No. 5,463,852 entitled "Wide Cut Harvester having Rotary Cutter Bed," and U.S. Pat. No. 6,158,201 entitled "Rotary Mower Conditioner Having Improved Crop Flow" to Pruitt et al., which are assigned to the assignee of the present invention.

Each pair of oppositely rotating rotary cutters 302 sends a rearwardly directed stream of severed material between the cooperating pair of rotary cutters 302 as illustrated by arrow 308 as the mower 102 moves through the field of standing crop. The outermost outboard rotary cutters 302 rotate in the same direction as the inwardly adjacent outboard rotary cutters 302, respectively. Thus, outermost outboard rotary cutter 302 on the left rotates in a clockwise direction viewing FIG. 3, while outermost outboard rotary cutter 302 on the right rotates in a counterclockwise direction viewing that same figure. Consequently, crop material cut by outboard first and second rotary cutters 302 and the ninth and tenth rotary cutters 302 is thrown laterally inwardly across the front of the machine to the overlap region between the second and third rotary cutters 302 and eighth and ninth rotary cutters 302, respectively, where it is swept rearwardly in streams 308, as shown by the arrows in FIG. 3.

Figure 4:
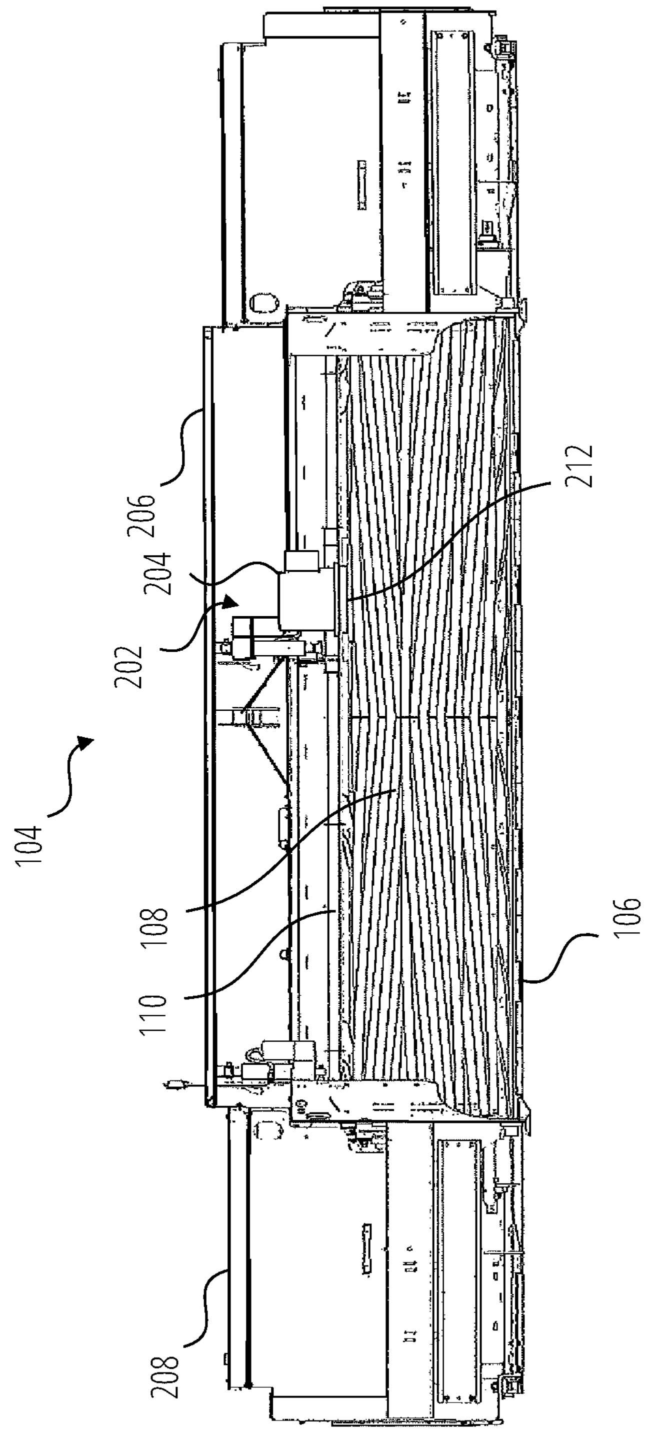
FIG. 4 illustrates a rear elevation vies of the header assembly of FIG. 1 in accordance with a second embodiment.
Figure 5:
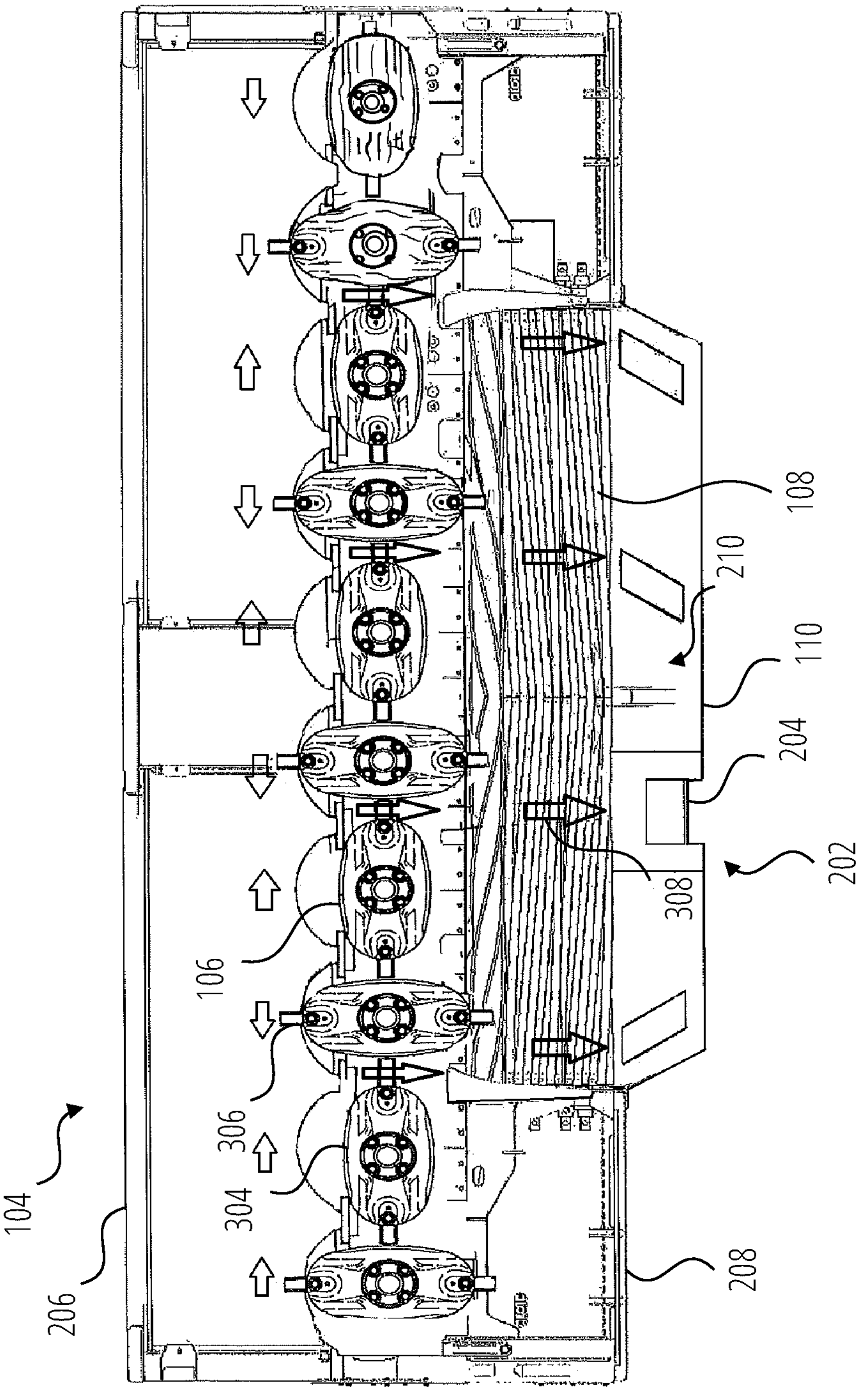
FIG. 5 illustrates a bottom view of the header assembly of FIG. 1 in accordance with the second embodiment.

The swathboard 110 has a lateral length that approximately equal to the width of the discharge opening 210. The sensor 204 is positioned laterally along the swathboard 110 to coincide with the location where one of the crop streams 308 interacts with the swathboard 110 as the crop material moves rearward through the discharge opening 210. In FIGS. 2 and 3, the sensor 204 is placed to interact with the crop stream 308 that is produced by the second and third rotary cutters 302 from the left of the header assembly 104 such that the sensor 204 is adjacent an outer end of the swathboard 110. FIGS. 4 and 5 show an alternate embodiment with the sensor 204 placed to interact with the crop stream 308 that is produced by the fourth and fifth rotary cutters 302 from the left of the header assembly 104 such that the sensor 204 is positioned in an interior middle portion of the swathboard 110.

The sensor system 202 is configured so that so that the sensor 204 is moveable relative to the swathboard 110 so that the orientation of the sensor face 212 with respect to the crop stream 308 can be changed to improve the quality and usefulness of the signal generated by the sensor 204. As perhaps, better seen in FIGS. 6 and 7, the swathboard 110 is mounted on a rockshaft 602 with a plurality of brackets 604. The rockshaft 602 is rotatably mounted to the framework 206 of the header assembly 104 such that the rockshaft 602 may pivotably position the swathboard 110 as is known in the art. Desirably, the sensor system 202 automatically adjusts the orientation of the sensor 202 by analyzing the signal generated by the sensor 204 and adjusting the sensor's orientation relative to the crop stream 308 until the signal quality is maximized. Desirably, the sensor 204 pivots about the same axis as the adjustable swathboard 110.

Figure 6:
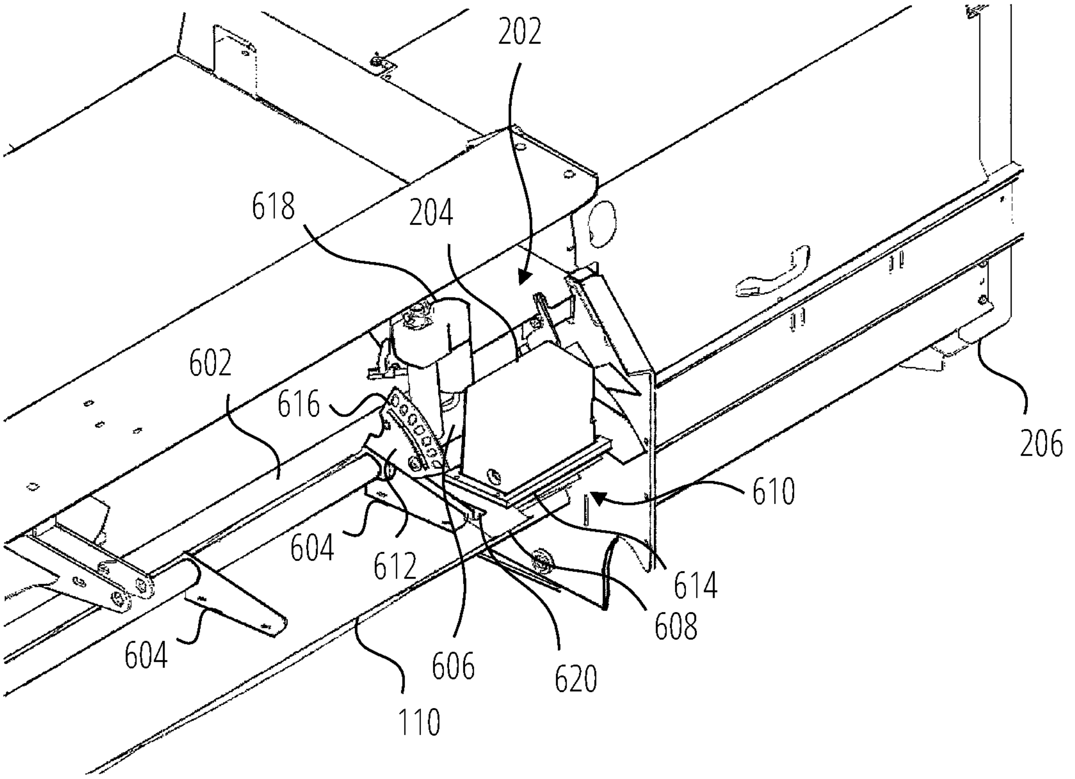
FIG. 6 illustrates an enlarged perspective view of a portion of the header assembly of FIG. 2.
Figure 7:
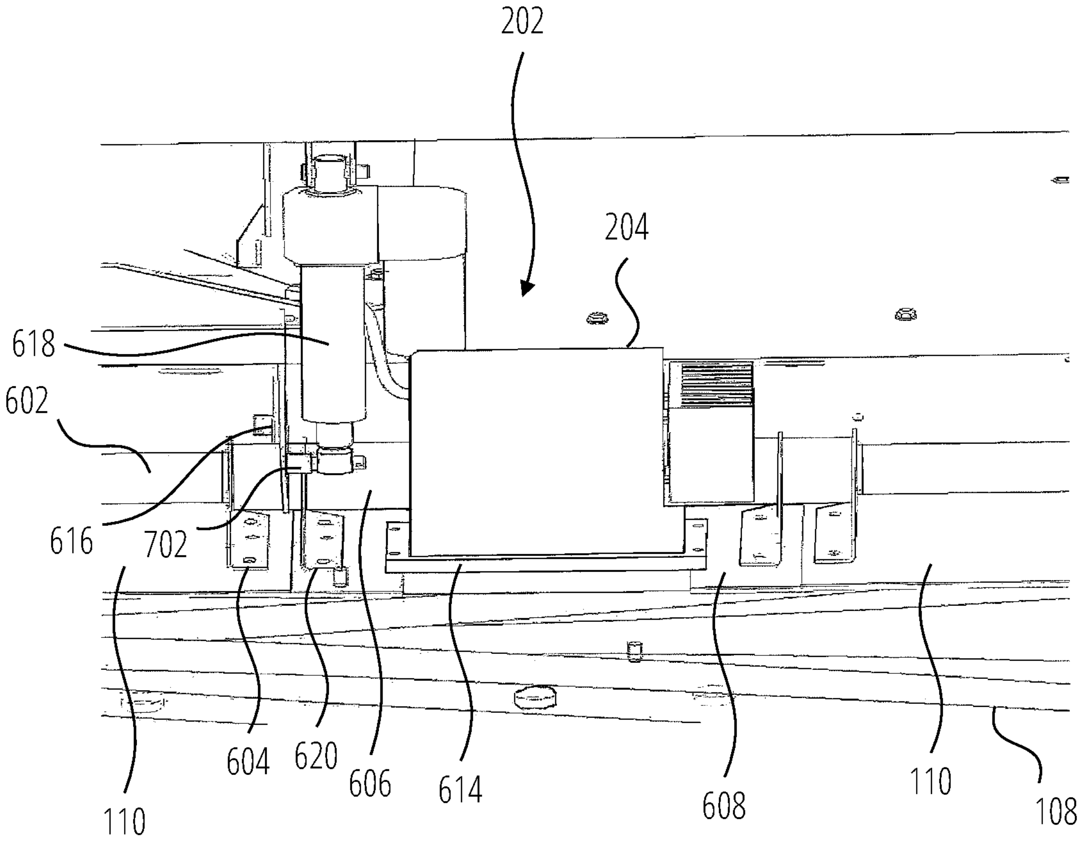
FIG. 7 illustrates an enlarged perspective view of a portion of the header assembly of FIG. 4.

In the embodiment illustrated in FIGS. 6 and 7, a pivot tube 606 is co-aligned with the rockshaft 602. The pivot tube 606 connects to a shoe plate 608. The swathboard 110 has a cutout 610 into which the shoe plate 608 is received such that the swathboard 110 and the shoe plate 608 are generally co-planer in a base orientation of the shoe plate 608, but with the shoe plate 608 being capable of pivoting movement relative to the swathboard 110. The shoe plate 608 is connected to the pivot tube 606 with a mounting plate 612. A sensor shoe 614 mounts the sensor 204 onto the shoe plate 608 such that a crop facing surface of the sensor 204 is exposed to the crop stream 308 passing through the header assembly 104. When it is desired to move the sensor 204 to obtain better quality of spectra, the shoe plate 608 on which the sensor 204 is mounted is moved relative the swathboard 110 to better position the sensor 204.

Desirably, the position of the shoe plate 608 can be manually adjusted using a guide 616 on the mounting plate 612. Also, desirably, the position of the mounting plate relative the swathboard 110 can be adjusted using an actuator 618 connected to the mounting plate that is configured to rotate the pivot tube 606 relative the rockshaft 602. In one embodiment, the actuator 618 is a hydraulic actuator. However, the actuator 618 may be an electric, pneumatic, or other type of actuator without departing from the scope of the invention.

It is believed that the sensor 204 provides best results when the crop-facing surface of the sensor is positioned such that the stream 308 of plant material blocks out most of the ambient light. When the swathboard 110 is in its full down position to maximize contact with the crop material such that the crop material is directed down to the ground, the sensor 204 generally performs well with the shoe plate 608 generally co-planer with the swathboard 110 in its base orientation. When the swathboard 110 is positioned in its full up position such that much of the crop flow avoids the swathboard 110 and is directed back to the forming shields 112, it is desirable to pivot the sensor 204 away from the base orientation to an extended position down into the crop flow stream 308 to obtain better readings from the sensor 204.

Figure 8:
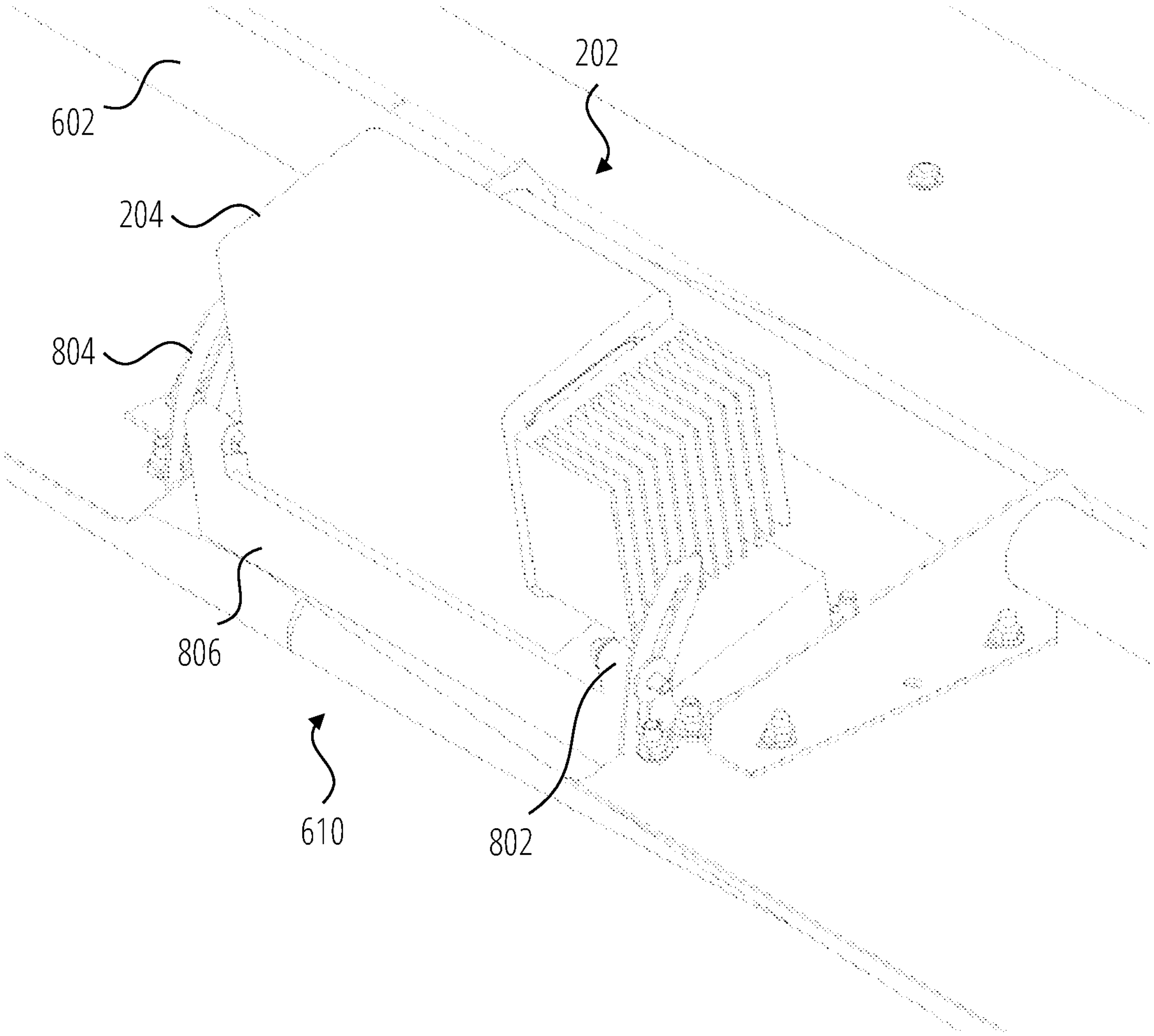
FIG. 8 illustrates an enlarged perspective view of a portion of a third embodiment of the header assembly.

FIG. 8 illustrated another embodiment of the sensor system 202 mounted on the swathboard 110. In this embodiment, the guide 616 is mounted on the swathboard 110 and a pin connector 802 engaged with the guide 804 is used to adjust the orientation of the sensor 204 with respect to the swathboard 110 and the stream 308 of crop material flowing through the header assembly 104.

Although the invention has been described with reference to the one or more embodiments illustrated in the figures, it is understood that equivalents may be employed and substitutions made herein without departing from the scope of the invention as recited in the claims.

What is claimed is:

1. A mower configured to cut plant material as the mower moves over a field and deposits the cut plant material on the field, the mower including a header assembly having a cutter bed, conditioning rollers, and a swathboard, the swathboard being positionable to shape the cut plant material into windrows, wherein the cutter bed has a plurality of rotating rotary cutters, wherein said plurality of rotary cutters comprises at least one pair of oppositely rotating rotary cutters that sends a rearwardly-directed stream of cut plant material between the oppositely rotating pair of rotary cutters, wherein the header assembly comprises a sensor system mounted on the swathboard, the sensor system having a sensor configured to collect nutrient information of the plant material being cut by the mower, wherein the sensor is positioned on the swathboard to coincide with the location where the stream of cut plant material interacts with the swathboard, and wherein the sensor is moveable relative to the swathboard via a pivot tube co-aligned with a rockshaft on which the swathboard is mounted, such that the sensor pivots about the same axis as the swathboard.

2. The mower of claim 1, wherein movement of the sensor relative to the swathboard changes the orientation of a crop-facing sensor face of the sensor relative a crop facing surface of the swathboard.

3. The mower of claim 1, wherein the cutter bed comprises ten rotary cutters across the cutter bed, and the crop material cut by first and second rotary cutters and ninth and tenth rotary cutters is thrown laterally inwardly across a front portion of the header assembly to an overlap region between the second and a third rotary cutter and an eighth and the ninth rotary cutter, respectively, where the cut crop material is swept rearwardly in streams from the overlap regions.

4. The mower of claim 3 wherein the sensor is placed to interact with the crop stream that is produced by the second and third rotary cutters such that the sensor is adjacent an outer end of the swathboard.

5. The mower of claim 3 wherein the sensor is placed to interact with the crop stream that is produced by a fourth and a fifth rotary cutter such that the sensor is positioned in an interior middle portion of the swathboard.

6. The mower of claim 1 wherein the sensor is a near-infra-red (NIR) sensor.

* * * * *